US 6,559,417 B2

(12) United States Patent
Kim et al.

(10) Patent No.: US 6,559,417 B2
(45) Date of Patent: May 6, 2003

(54) FLUX CORED WIRE FOR ARC-WELDING OF AUSTENITIC STAINLESS STEEL

(75) Inventors: Jongwon Kim, Changwon (KR); Chulgyu Park, Changwon (KR)

(73) Assignee: Kiswell Ltd., Changwon (KR)

( * ) Notice: Subject to any disclaimer, the term of this patent is extended or adjusted under 35 U.S.C. 154(b) by 63 days.

(21) Appl. No.: 09/867,670

(22) Filed: May 31, 2001

(65) Prior Publication Data
US 2002/0008096 A1 Jan. 24, 2002

(30) Foreign Application Priority Data
Jun. 7, 2000 (KR) .......................................... 2000-31161

(51) Int. Cl.⁷ ............................................... B23K 35/02
(52) U.S. Cl. .............................. 219/145.22; 219/146.1; 219/146.23
(58) Field of Search ..................... 219/145.22, 146.1, 219/146.23, 146.41; 148/23; 75/302

(56) References Cited

U.S. PATENT DOCUMENTS 6,340,396 B1 * 1/2002 Ogawa et al. ................. 148/23

* cited by examiner

Primary Examiner—M. Alexandra Elve
(74) Attorney, Agent, or Firm—Bacon & Thomas

(57) ABSTRACT

The present invention discloses a flux cored wire for arc welding of austenitic stainless steel which can restrain bending and high temperature cracking, and prevent a bead from being drooped. A flux filled in a sheath consisting of 18-8 stainless steel($C \leq 0.03$ wt %, $N \leq 0.02$ wt %) comprises an alkali metal compound in an oxide converted amount of 0.05 to 1.0 wt % by weight of the welding wire, a metal fluoride in a fluorine converted amount below 0.08 wt %, Bi oxide in an amount below 0.1 wt %, Mn in an amount of 0.1 to 1.8 wt %, Cr in an amount of 2.0 to 4.0 wt %, $SiO_2$ in an amount of 0.5 to 3.0 wt %, $Al_2O_3$ in an amount of 0.1 to 2.0 wt %, and $TiO_2$ and $ZrO_2$ wherein a ratio of $(TiO_2+ZrO_2)/SiO_2$ is 0.8 to 1.6. Here, an amount of the flux filled in the sheath ranges from 15 to 35 wt % by weight of the welding wire. Accordingly, the flux cored wire restrains bending and high temperature cracking of the stainless steel weld metal, prevents the bead from being drooped, and reduces an amount of fume generated, thereby improving the vertical-up weldability.

1 Claim, 2 Drawing Sheets

[Figure 1]
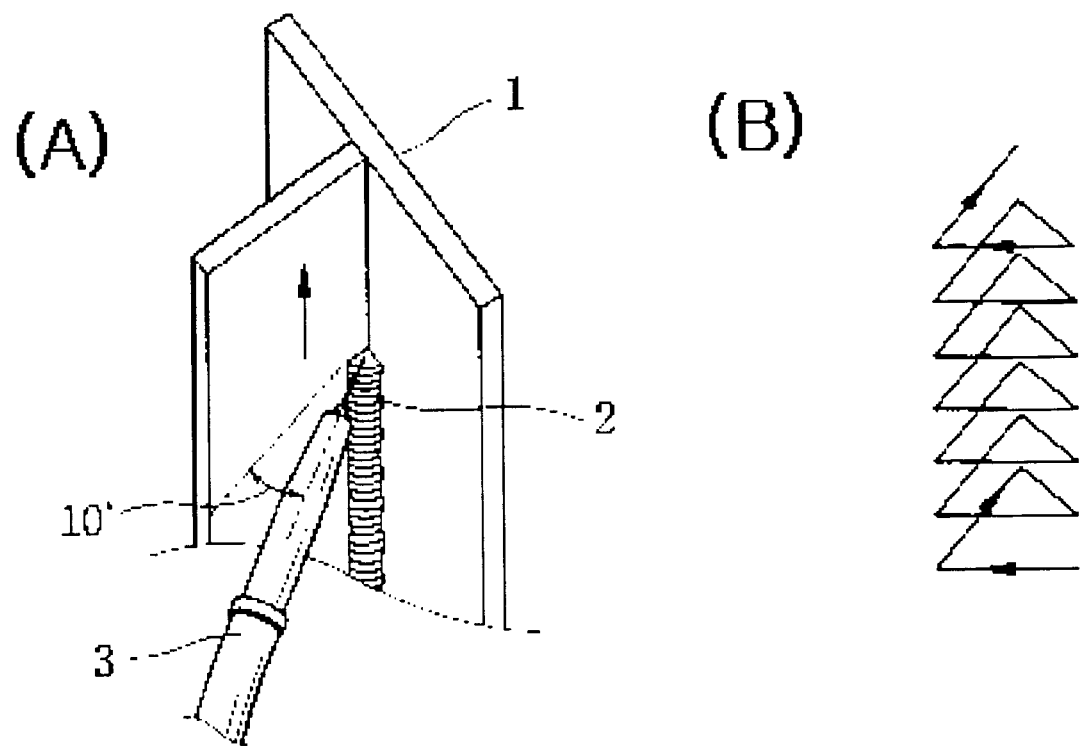

[Figure 2]
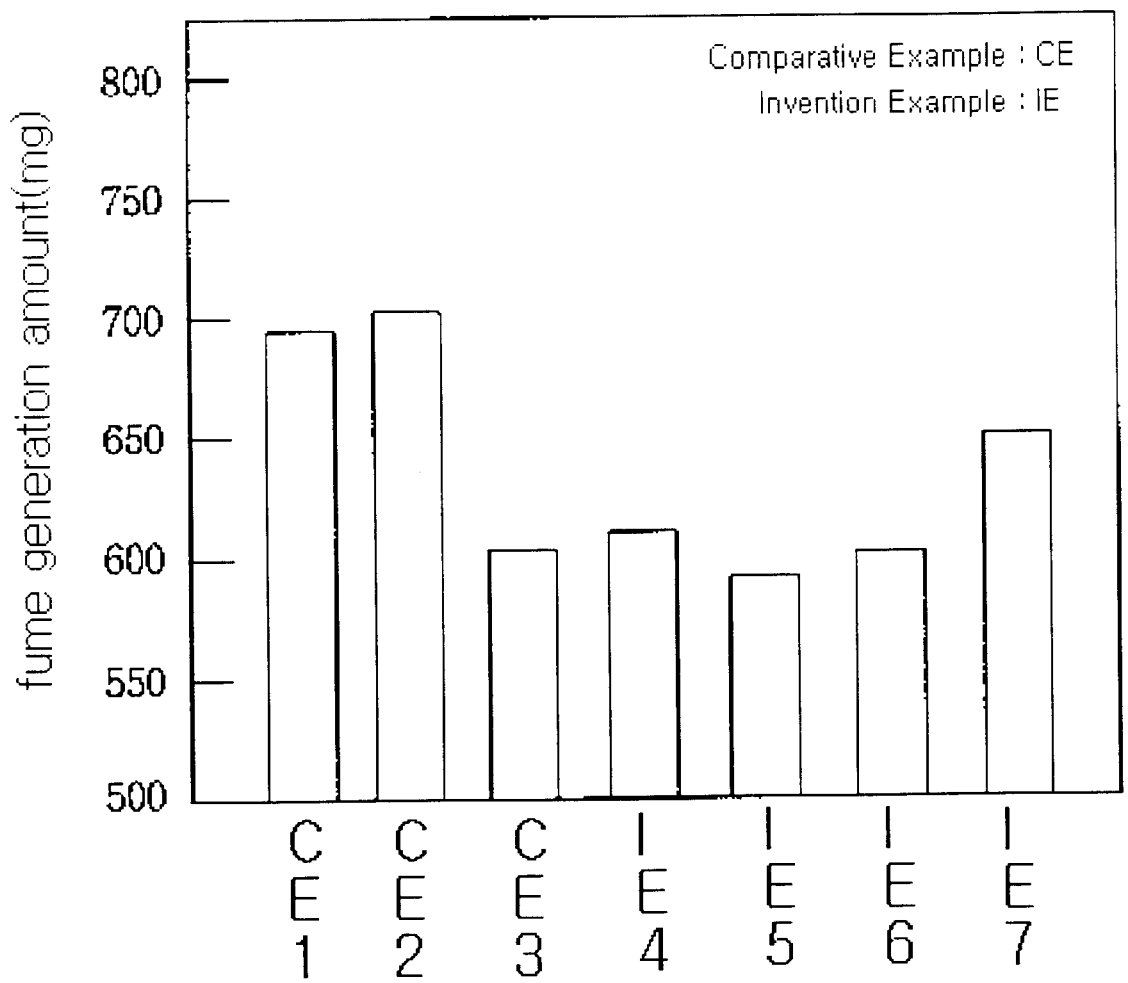

FLUX CORED WIRE FOR ARC-WELDING OF AUSTENITIC STAINLESS STEEL

BACKGROUND OF THE INVENTION

1. Field of the Invention

The present invention relates to a flux cored wire for arc welding of austenitic stainless steel, and in particular to an improved flux cored wire for arc welding of austenitic stainless steel which can stably perform the welding, by reducing an amount of spatters generated in the arc welding of austenitic stainless steel, especially by preventing a weld metal from being drooped in the vertical-up position welding, and which can also form a stable weld metal at a high temperature.

2. Description of the Related Art

Stainless steel is a kind of alloy steel of steel and Cr having improved corrosion resistance. According to the composition, the stainless steel is classified into Cr group and Cr—Ni group. According to the metal structure the stainless steel is classified into martensite group, ferrite group, austenite group, austenite-ferrite group and precipitation hardening group.

The austenitic stainless steel(hereinafter, referred to as 'stainless steel') belongs to the Cr—Ni group. The representative stainless steel is 18-8 stainless steel of 18 wt % Cr-8 wt % Ni which has the most economical composition. A variety of steels have been developed therefrom.

Although widely employed due to its superior corrosion resistance, the stainless steel has low weldability. Thus, a welding wire has been improved suitable for the arc welding of the stainless steel, thereby removing defects in a weld metal. However, an amount of spatters generated is increased in the welding, to cause the following problems:

That is, a weld metal is spattered and adhered to a non-weld metal. Accordingly when the welding is finished, an unnecessary process such as grinding is required to remove the metal in the non-weld metal thereby reducing efficiency. In addition a bead is easily drooped in the vertical-up position welding. As a result, the bead has a poor shape, and a succeeding welding is difficult to carry out.

In order to solve the aforementioned problems. Bi containing material is added to a flux composing the welding wire, which increases cracking sensitivity of the weld metal at a high temperature.

SUMMARY OF THE INVENTION

Accordingly, an object of the present invention is to provide a flux cored wire for arc welding of austenitic stainless steel which can prevent a welding material from being spattered and a bead from being drooped, by reducing an amount of spatters generated in the welding, and which also can prevent a crack from occurring at a high temperature.

In order to achieve the above-described object of the present invention, a flux containing an alkali metal compound, metal fluoride, $SiO_2$, $TiO_2$, $ZrO_2$, Bi, Mn and Cr is filled in a sheath consisting of stainless steel in an amount of 15 to 35 wt % by weight of the welding wire.

It has been found that when the flux is used in the amount less than 15 wt %, slag covering a surface of the bead is not sufficiently generated, and when the flux is used in the amount greater than 35 wt %, the welding wire is easily bent due to the weight of the flux when feeding.

BRIEF DESCRIPTION OF THE DRAWINGS

The above objects, features and advantages of the present invention will become more apparent from the following detailed description when taken in conjunction with the accompanying drawings, in which:

FIG. 1 shows a vertical-up welding method, wherein:

FIG. 1(A) is a perspective view illustrating a weld portion; and

FIG. 1(B) shows a proceeding direction of a welding torch; and

FIG. 2 is a graph showing an amount of welding fume generated in wires of Invention Examples and Comparative Examples.

DETAILED DESCRIPTION OF THE PREFERRED EMBODIMENT

A preferred embodiment of the present invention will now be described with reference to the accompanying drawings. In the following description, same drawing reference numerals are used for the same elements even in different drawings. The matters defined in the description such as a detailed construction and elements of a circuit are nothing but the ones provided to assist in a comprehensive understanding of the invention. Thus, it is apparent that the present invention can be carried out without those defined matters. Also, well-known functions or constructions are not described in detail since they would obscure the invention in unnecessary detail.

A flux cored wire for arc welding of austenitic stainless steel in accordance with the present invention will now be described with reference to the accompanying drawings.

A flux for the welding wire comprises an alkali metal compound in an oxide converted amount of 0.05 to 1.0 wt % by weight of the welding wire, a metal fluoride in a fluorine converted amount below 0.08 wt %, Bi oxide in an amount below 0.1 wt %. Mn in an amount of 0.1 to 1.8 wt %, Cr in an amount of 2.0 to 4.0 wt %, $SiO_2$ in an amount of 0.5 to 3.0 wt %, $Al_2O_3$ in an amount of 0.1 to 2.0 wt % and $TiO_2$ and $ZrO_2$ wherein a ratio of $(TiO_2+ZrO_2)/SiO_2$ is 0.8 to 1.6.

In addition, 18-8 stainless steel($C \leqq 0.03$ wt %, $N \leqq 0.02$ wt %) is used as a stainless steel sheath where the flux is filled.

The roles of the flux components composing the welding wire will now be described in accordance with the present invention.

Firstly, the alkali metal compound which does not contain carbonate and fluoride serves to stabilize an arc. When the alkali metal compound is used in an amount less than 0.05 wt %, it is not effective. When the alkali metal compound is used in an amount greater than 1.0 wt %, it results in reduced hygroscopicity resistance. Preferably, titanate such as potassium titanate and sodium titanate is employed as the alkali metal compound.

The metal fluoride is a slag formation material covering the weld metal, improving a bead shape and decreasing a welding gas However, the metal fluoride increases spatters. Accordingly, the metal fluoride is preferably added as little as possible. Actually, the metal fluoride can be maximally used in a fluorine converted amount of 0.08 wt %.

The Bi oxide improves a detachability property of the slag. When used in an amount greater 0.1 wt %, the Bi oxide increases welding crack sensitivity, and decreases high temperature creeping.

Mn obtains a deoxidation effect for the weld metal. When used in an amount less than 0.1 wt %, Mn cannot obtain such an effect. On the other hand, when used in an amount greater than 1.8 wt %. Mn reduces ductility of the weld metal Cr is added to improve high temperature strength of the weld metal. When Cr is used in an amount less than 2.0 wt %, oxidation resistance is reduced at a high temperature. On the other hand, when Cr is used in an amount greater than 4.0 wt %, the weld metal has low toughness and high brittleness.

$SiO_2$ is a representative slag formation material for Improving the covering property of the slag and the bead shape. When used in an amount less than 0.5 wt %, $SiO_2$ does not obtain such effects. When $SiO_2$ is used in an amount greater than 3.0 wt %, the bead is excessively convex due to increased viscosity of the slag.

$Al_2O_3$ improves jointing property of the weld metal and the base metal. When used in an amount less than 0.1 wt %, $Al_2O_3$ is not effective. In addition, when $Al_2O_3$ is used in an amount greater than 2.0 wt %. an amount of $Al_2O_3$ remaining in the slag is increased, thereby reducing the detachability property of the slag.

$TiO_2$ and $ZrO_2$ are also slag formation materials for improving the covering property of the slag and the bead shape. In addition, $TiO_2$ and $ZrO_2$ serve to stabilize the arc to prevent arc concentration, thereby reducing an amount of spatters. However, when the ratio of $(TiO_2+ZrO_2)/SiO_2$ is less than 0.8, $TiO_2$ and $ZrO_2$ do not obtain such effects. On the other hand, when the ratio of $(TiO_2+ZrO_2)/SiO_2$ is greater than 1.6, the slag is excessively formed and the bead has a poor shape.

The composition and welding property of the flux cored wire in accordance with the present invention will now be described in detail, by referring to the examples below.

For comparison with the wire of the present invention, Table 1 shows a flux composition of a conventional wire.

TABLE 1

| | | Flux composition rate for entire weight of wire (wt %) | | | | | | | |
|---|---|---|---|---|---|---|---|---|---|
| Item | | $TiO_2$ | $SiO_2$ | $Al_2O_3$ | $ZrO_2$ | Bi oxide | Metal fluoride | Alkali metal compound | Filling rate (wt %) |
| Comparative | 1 | 3.8 | 3.0 | 1.5 | 1.2 | 0.12 | 0.10 | 0.2 | 20 |
| Example | 2 | 3.6 | 4.0 | 1.5 | 3.0 | 0.15 | 0.10 | 0.1 | 20 |
| Invention | 3 | 2.5 | 3.0 | 1.0 | 2.0 | 0.05 | 0.05 | 0.2 | 20 |
| Example | 4 | 2.5 | 3.0 | 1.0 | 2.0 | 0.05 | 0.05 | 0.2 | 20 |
| | 5 | 2.5 | 3.0 | 1.0 | 1.8 | 0.05 | 0.05 | 0.1 | 20 |
| | 6 | 3.0 | 3.5 | 1.0 | 2.0 | 0.05 | 0.05 | 0.1 | 20 |
| | 7 | 3.0 | 4.0 | 1.0 | 1.8 | 0.05 | 0.05 | 0.1 | 20 |

The wires of Invention examples and Comparative examples are welded in the in Table 2. The components and mechanical property of the respective shown in Table 3.

TABLE 2

| Base metal | Welding current | Welding voltage | Welding speed | Shielded gas |
|---|---|---|---|---|
| SUS 304, thickness 6$^t$ | 210 A | 30 V | 25 cm/min | $CO_2$ |

TABLE 3

| | | Deposited components of weld metal (wt %) | | | | | | | Surface bending test | Back bending test | High temperature crack test |
|---|---|---|---|---|---|---|---|---|---|---|---|
| Item | | C | Si | Mn | Ni | Cr | Mo | P | S | | | |
| Comparative | 1 | 0.037 | 0.60 | 1.34 | 9.96 | 19.50 | 0.05 | 0.016 | 0.009 | Good | 2.5 | 6.5 |
| Example | 2 | 0.041 | 0.58 | 1.26 | 9.52 | 19.38 | 0.05 | 0.018 | 0.010 | Good | 3 | 8 |
| Invention | 3 | 0.028 | 0.50 | 1.24 | 9.50 | 19.42 | 0.05 | 0.013 | 0.009 | Good | Good | Good |
| Example | 4 | 0.020 | 0.53 | 1.38 | 9.48 | 19.40 | 0.05 | 0.011 | 0.010 | Good | Good | Good |
| | 5 | 0.027 | 0.60 | 1.27 | 9.80 | 19.47 | 0.05 | 0.016 | 0.010 | Good | Good | Good |
| | 6 | 0.031 | 0.64 | 1.30 | 9.67 | 19.66 | 0.05 | 0.014 | 0.010 | Good | Good | Good |
| | 7 | 0.030 | 0.60 | 1.26 | 9.68 | 19.63 | 0.05 | 0.016 | 0.010 | Good | Good | Good |

The bending tests and the high temperature crack test are respectively performed according to JIS Z 3122 and JIS Z 3153.

The test values represent a length of a crack in the weld metal, and a measurement unit thereof is mm.

As shown in Table 3, in Comparative Examples, a crack is generated in the weld metal in the back bending test and the high temperature crack test. At this time, the Bi oxide is used in an amount greater than 0.1 wt % by weight of the wire, thereby increasing cracking sensitivity and decreasing ductility at a high temperature.

FIG. 1 is a perspective view showing a vertical-up single pass welding using the welding wires of Invention Examples and Comparative Examples.

Here, the welding is performed upwardly in a state where a base metal 1 is formed in a 'T' joint, and a welding torch 3 is sloped by 10° in a horizontal direction. As depicted in FIG. 1(B), in the single pass welding, the welding is performed once so that a proceeding direction of the welding torch can consecutively form the track of triangles. The welding workability of the wires is shown in Table 4. FIG. 2 is a graph showing an amount of fume generated in the welding. As shown in FIG. 2, the amount of fume generated is much more reduced in the wires of Invention Examples than those of Comparative Examples.

TABLE 4

| Item | Welding workability | | | |
| --- | --- | --- | --- | --- |
| | Arc stability | Slag detachability property | Fume generation amount | Vertical-up weldability |
| Comparative 1 | 0 | 0 | Δ | x |
| Example 2 | 0 | 0 | Δ | x |
| Invention 3 | 0 | 0 | 0 | 0 |
| Example 4 | 0 | 0 | 0 | 0 |
| 5 | 0 | 0 | 0 | 0 |
| 6 | 0 | 0 | 0 | 0 |
| 7 | 0 | 0 | 0 | 0 |

* 0: good, Δ: normal, x: poor(sagged/fallen bead)

As shown in Table 4, the vertical-up weldability of Comparative Examples 1 and 2 are worse than that of Invention Examples. Here, the ratio of $(TiO_2+ZrO_2)/SiO_2$ is over 1.6, and thus the weld bead has a poor shape. That is, the bead is sagged or fallen.

As discussed earlier, in accordance with the present invention, the flux cored wire for the arc welding of the stainless steel restrains bending and high temperature cracking of the stainless steel weld metal, prevents the bead from being drooped, and reduces an amount of fume generated, thereby improving the vertical-up weldability.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A flux cored wire for arc welding of austenitic stainless steel, wherein a flux filled in a sheath consisting of 18-8 stainless steel (C≦0.03 wt %, N≦0.02 wt %) comprises an alkali metal compound in an oxide converted amount of 0.05 to 1.0 wt %, a metal fluoride in a fluorine converted amount below 0.08 wt %, Bi oxide in an amount below 0.1 wt %, Mn in an amount of 0.1 to 1.8 wt %, Cr in an amount of 2.0 to 4.0 wt %, $SiO_2$ in an amount of 0.5 to 3.0 wt %, $Al_2O_3$ in an amount of 0.1 to 2.0 wt % of the entire weight of the welding wire, respectively, $TiO_2$ and $ZrO_2$ wherein a ratio of $(TiO_2+ZrO_2)/SiO_2$ is 0.8 to 1.6, and the flux ranges from 15 to 35 wt % by weight of the welding wire.

* * * * *

UNITED STATES PATENT AND TRADEMARK OFFICE
CERTIFICATE OF CORRECTION

PATENT NO.    : 6,559,417 B2
DATED         : May 6, 2003
INVENTOR(S)   : Kim et al.

It is certified that error appears in the above-identified patent and that said Letters Patent is hereby corrected as shown below:

<u>Title page,</u>
Item [73], please correct the Assignee name to -- Kiswel Ltd., Changwon (KR) --

Signed and Sealed this

Seventh Day of October, 2003

JAMES E. ROGAN
*Director of the United States Patent and Trademark Office*